United States Patent [19]

Kerguiduff

[11] Patent Number: 5,414,767
[45] Date of Patent: May 9, 1995

[54] ECHO CANCELLER

[75] Inventor: Marianne Kerguiduff, Trebeureden, France

[73] Assignee: U.S. Philips Corporation, New York, N.Y.

[21] Appl. No.: 156,487

[22] Filed: Nov. 23, 1993

[30] Foreign Application Priority Data

Nov. 25, 1992 [FR] France ................. 92 14187

[51] Int. Cl.⁶ ............................................. H04M 9/08
[52] U.S. Cl. .................................... 379/410; 379/402; 379/406; 379/407; 379/390
[58] Field of Search ............. 379/410, 402, 406, 409, 379/407, 389, 390

[56] References Cited

U.S. PATENT DOCUMENTS 5,263,020 11/1993 Yatsuzuka et al. ................. 379/410

OTHER PUBLICATIONS

An Adaptive Step Sign Algorithm for Fast Convergence of a Data Echo Canceller (IEEE Transactions on Communications, vol. COM-35, No. 10 Oct. 1987) Akira Kanemasa.

A. Kanemasa, and K. Niwa, "an Adaptive-Step Sign Algorithm for Fast Convergence of a Data Echo Canceller", IEEE, vol. COM-35, No. 10, Oct. 1987, pp. 1102–1108.

M. Bellanger, Analyse Des Signaux et Filtrage Numerique Adaptatif, Collection Technique Et Scientifique Des Telecommunication, 1989, pp. 126–130.

*Primary Examiner*—James L. Dwyer
*Assistant Examiner*—Jacques M. Saint-Surin
*Attorney, Agent, or Firm*—Leroy Eason

[57] ABSTRACT

An echo canceller arrangement (1) receives data $x(i)$ which are likely to generate an echo $r(i)$, and data $y(i)+r(i)$ affected by the echo. An echo synthesizer (50) forms a replica $r'(i)$ of the echo $r(i)$ on the basis of a series of data delayed by delay elements $70_1 \ldots 70_N$ and weighted by weight factors $c_k$, where $k=1, \ldots, N$. An arithmetic element (85) determines the factors $c_k$ according to:

$$c_k(i+1) = c_k(i) + d \cdot c_k(i) \cdot \text{sign}[x(i-k) \cdot e(i)] \text{ where } d < 1.$$

7 Claims, 4 Drawing Sheets

ECHO CANCELLER

BACKGROUND OF THE INVENTION

1. Field of the Invention

The present invention relates to a transmission system comprising a first station connected to a second station by a transmission channel, each station comprising a transmitter and a receiver, at least the first station comprising an echo canceller arrangement which includes an adaptive filter for generating, on the basis of data transmitted by the transmitter, a replica of an echo present in the input signal of the receiver, and a subtracter circuit for supplying to the receiver the difference between the input signal and the echo replica. The adaptive filter is arranged for determining the echo replica by calculating a sum weighted with weight factors of the transmitted data as delayed by multiples of a time period T.

2. Description of the Related Art

Such echo canceller arrangements are well known and find important applications in the field of telephone transmissions and data transmission. The echoes are most frequently due to mismatches caused by the 2-wire/4-wire transitions situated between a near-end speaker and a far-end speaker. In the field of telephone transmissions, the more distant the echo is, the more noticable it becomes. This effect of distance is enhanced in the digital telephone systems, which may introduce additional delays caused by the fact that a certain period of time is devoted to packetizing the speech signals.

For adjusting the weight factors one often uses the sign method. This method is described, more specifically, in paragraph IV.7 of the article by M. BELLANGER entitled: "ANALYSE DES SIGNAUX ET FILTRAGE NUMERIQUE ADAPTIF", published in 1989 by MASSON, PARIS. This method, which utilizes nonstationary signals, such as speech signals does have some drawbacks, however. It corrects the factors by adding thereto or subtracting therefrom a fixed quantity. This value is either low, and so the convergence of the factors to their optimum value is slow, or is high and so there is a risk of instability.

SUMMARY OF THE INVENTION

The present invention proposes an echo canceller arrangement which largely eliminates the drawbacks of the aforesaid prior art sign method.

Such arrangement is characterized in that it includes a calculation circuit to determine new values of at least one weight factor on the basis of the original value of the weight factor and a correction term which term is proportional to the weight factor, and to determine the correlation between the value of the delayed data multiplied by this weight factor and the difference between the input signal and the echo replica.

Preferably d will be selected to be $d = 2^{-m}$, where m is an integer. Thus, the multiplication by this value may be made by a simple shift, which facilitates the realization and the rapidity of the process.

BRIEF DESCRIPTION OF THE DRAWINGS

The following description, accompanied by the appended drawings, will be given by way of non-limiting example, and will make it better understood how the invention may be realized. In the drawings.

DESCRIPTION OF THE PREFERRED EMBODIMENTS

Figure 1:
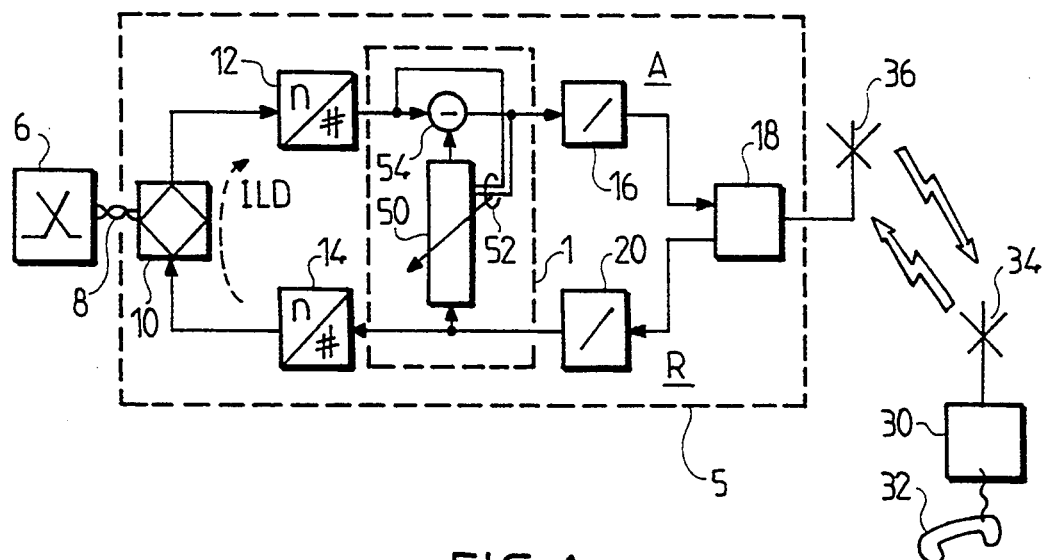
FIG. 1 represents a basic circuit diagram of the invention.

In FIG. 1 the echo canceller arrangement lie in the fixed part or base unit 5 of a DECT system defined by the ETSI as a cordless telephone system (cf. contribution ETS 300 175-8). The fixed part 5 is connected by a hybrid transformer 10 therein to a two-wire output line 8 which is connected to a switching centre 6. The hybrid transformer 10 separates the outgoing channel A from the return channel R. Channel A includes an analog-digital converter 12 and channel B includes a digital-analog converter 14. These converters work with linear digital samples, that is to say, they linearly code the analogue magnitude they represent, so that the echo canceller arrangement 1 works with linear digital samples. A code converter 16, inserted into the outgoing channel A, transforms this linear code into a differential code which is more suitable to process by a radio section 18 of the installation 5. A decoder 20 carries out the reverse operation in the return channel R.

The DECT installation also includes a mobile unit 30 to which a combination of subscribers 32 are connected. Two aerials 34 and 36 allocated to the mobile and the fixed part respectively, make it possible to form radio links for exchanging information between the two parts.

The echo canceller arrangement 1 is diagrammatically represented by an echo synthesizer 50 which comprises an adjustment control 52 and a subtracter circuit 54 which subtracts at the instant "i" a synthesized echo signal r'(i) from the signal supplied by the converter 12. The aim of this signal r'(i) is to cancel the echo r(i) caused, more specifically, by the hybrid transformer 10. The annoying effect of this echo is amplified by the delays caused by the fixed and mobile parts. The synthesizer is thus adjusted to cancel as much as possible the echo signal r(i) from the output of the circuit 54.

Figure 2:
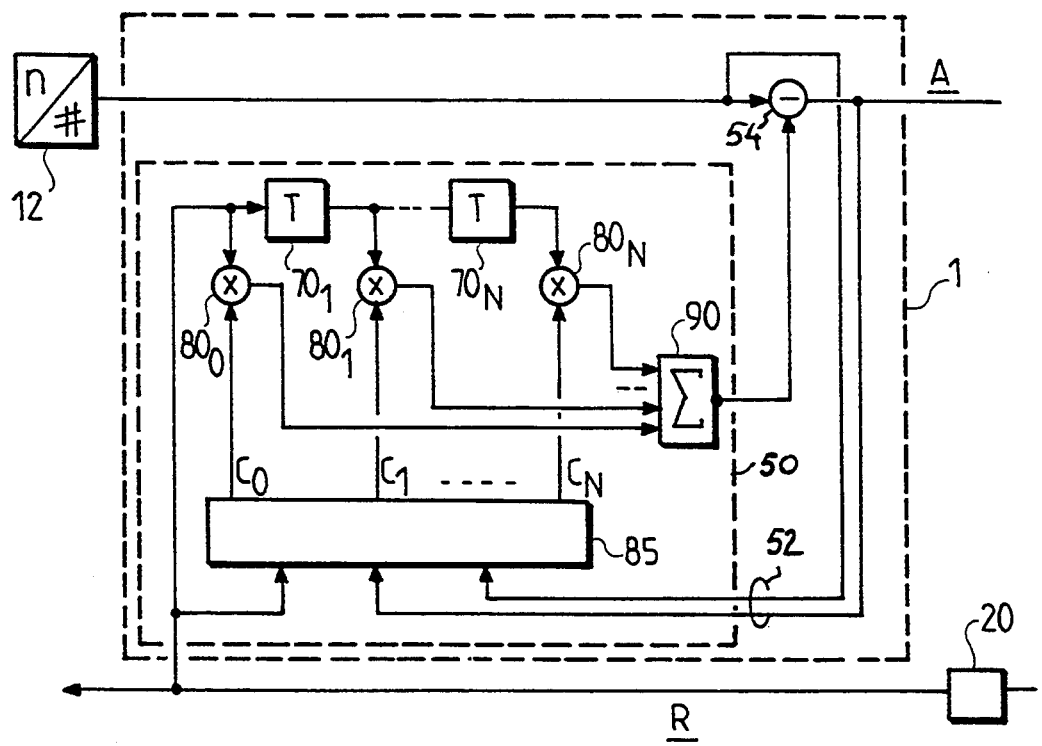
FIG. 2 represents the circuit diagram of an echo canceller used in the arrangement according to the invention.

FIG. 2 shows an operation circuit diagram of the echo canceller arrangement i and also of the echo synthesizer 50. The latter is formed by a succession of delay elements $70_1, \ldots, 70_N$, which each bring about a delay having a value T which corresponds to successive time period at which the samples produced by the converter 12 appear. Various multiplier circuits $80_0, 80_1, \ldots, 80_N$ multiply by weight factors $c_0, c_1, \ldots, c_N$ respectively, the sample at the input of the circuit $70_1$ and the various samples at the output of the other circuits $\ldots, 70_N$. An arithmetic circuit 85 determines the factors $c_0, c_1, \ldots, c_N$ in response to the output signal of the subtracter circuit 54. The output signals of the converters 12 and 20 are also used, but to a less fundamental degree, for adjusting these factors. A summing circuit 90 produces the synthesized echo by adding together all the results produced by the various multiplier circuits $80_0, 80_1, \ldots, 80_N$.

According to the invention, to determine these various factors $c_0, c_1, \ldots, c_N$, the arithmetic circuit 85 operates in the following manner:

the summing circuit 90 produces the synthesized echo r':

$$r' = \sum_{k=0}^{N} x(i-k) \cdot c_k(i) \quad (1)$$

the coefficients $c_k(i)$ are given by:

$$c_k(i+1) = c_k(i)(1 + d \cdot \text{sign}[x(i-k) \cdot u(i)]) \quad (2)$$

in this formula:

the sign function [. .]adopts the "+1" or "−1" value according to the sign of the argument.

$$u(i) = y(i) + r(i) - r'(i) \quad (3)$$

$d = 2^{-m}$, where m is an integer.

Figure 3:
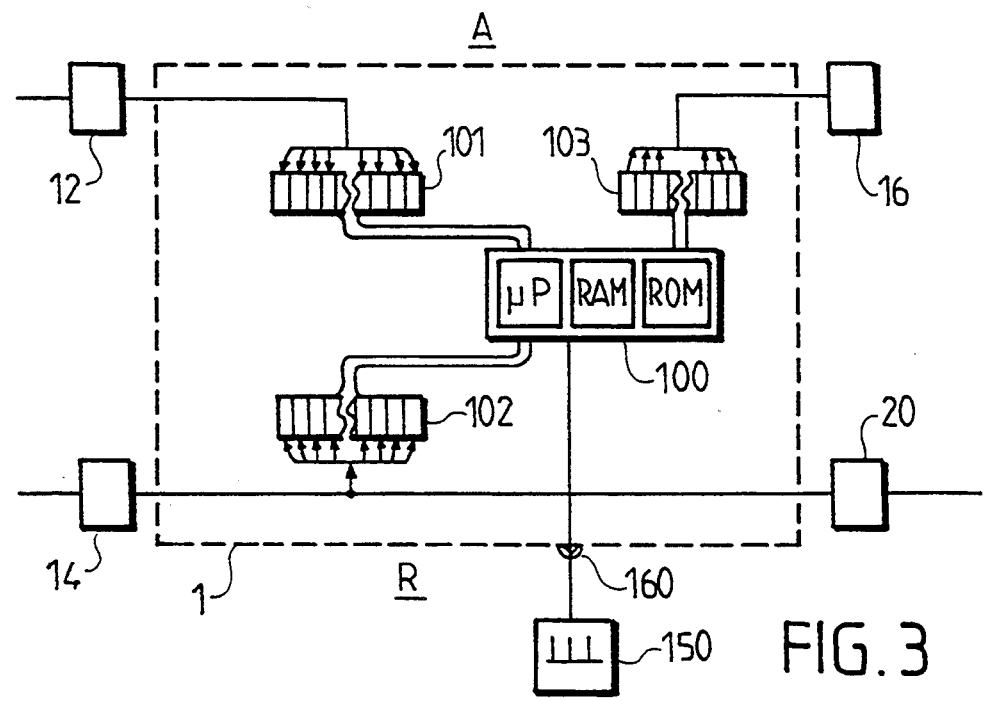
FIG. 3 represents a construction scheme of an arrangement according to the invention.

FIG. 3 shows a construction scheme of an arrangement according to the invention. This arrangement is built around a microprocessor ensemble 100 formed by an actual microprocessor, a read/write memory for containing various specifically intermediate data and also by a read only memory for containing, for example, the operation program. This ensemble may be formed by a signal processor of the TMS320 type. In the scheme shown in FIG. 3 various access ports connected to registers 101, 102 and 103 necessary for the operation of the arrangement 1 are shown in detail, whereas these registers are in fact incorporated in the same housing. Register 101 is intended to receive the samples produced by converter 12, register 102 is intended to receive the samples produced by converter 20 and register 103 is to contain the samples for converter 16. Reference 150 is a clock producing signals at the sample rate: 1/T. This clock is connected to an interrupt input 160, so that an interrupt routine can be carried out for each sample.

Figure 5:
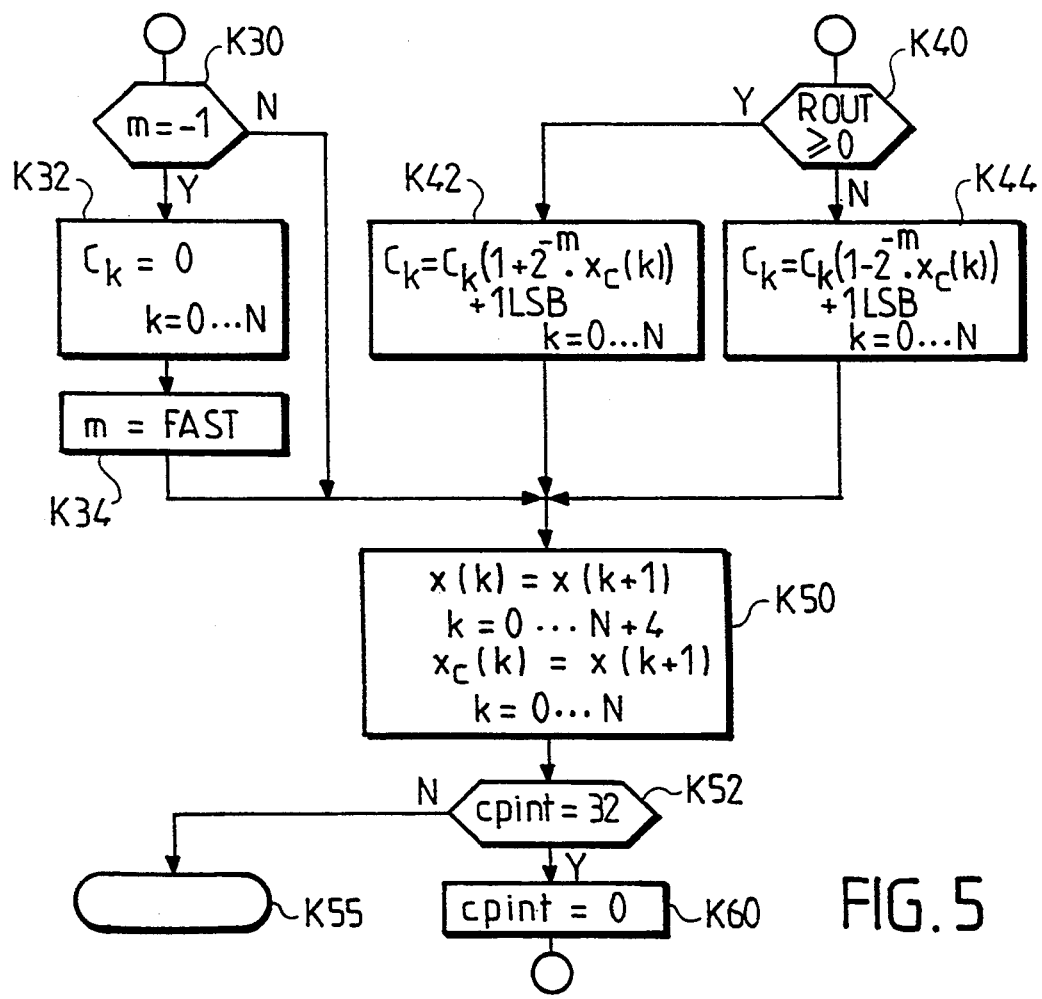
FIGS. 4 to 6 are operation flow charts of the arrangement shown in FIG. 3.
Figure 4:
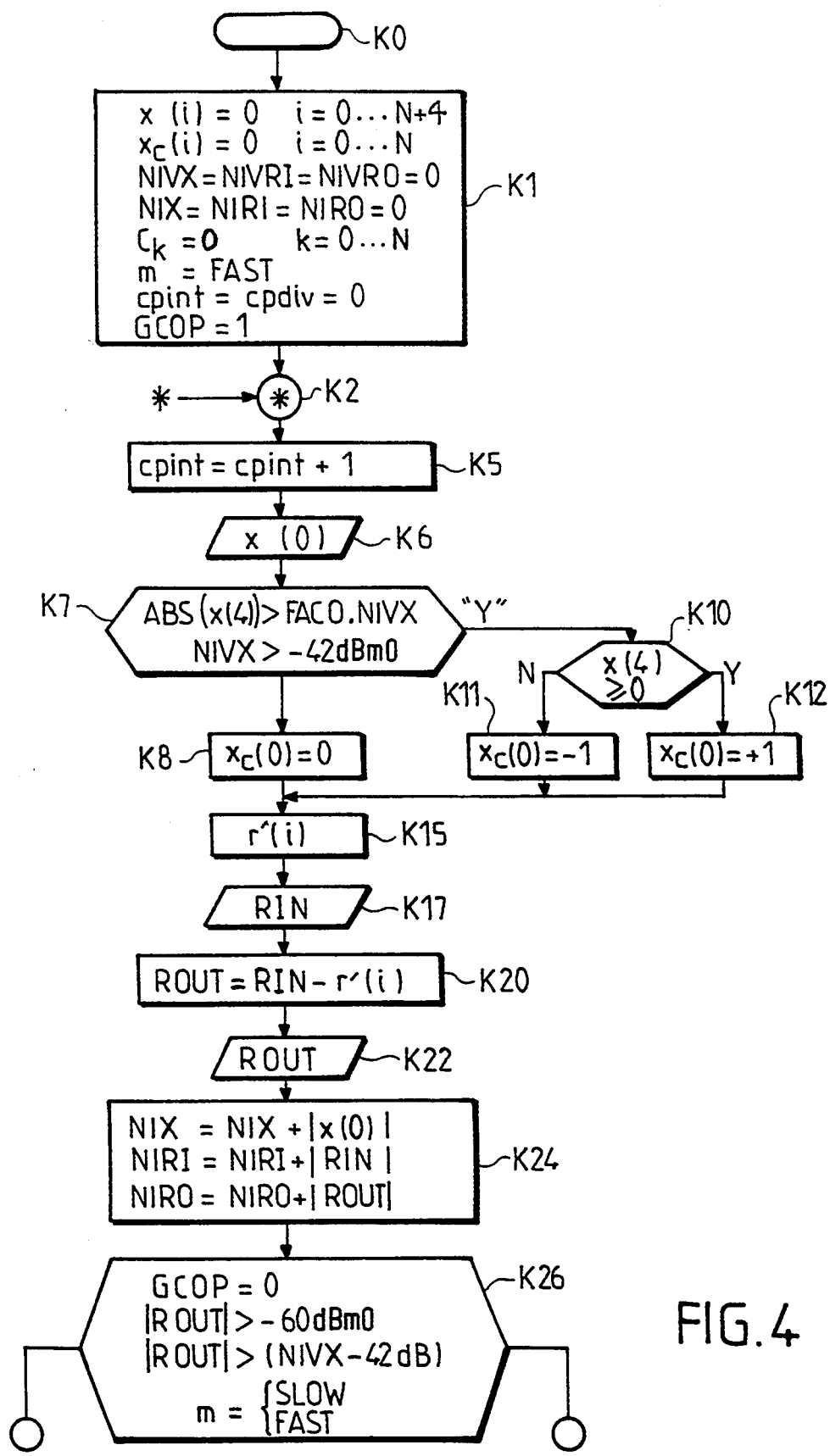

FIG. 4 shows part of the operation flow chart of an arrangement according to the invention. Box K0 shows the start of the program. Box K1 is an initialization phase where various variables receive their initial value. To provide that the rest of the program can be carried out, it is necessary that an interrupt signal produced by the clock 150 occurs which is indicated in box K2. Box K5 indicates the incrementation of the contents of an interrupt counter "cpint", after which, in box K6, the value x(0) is read out which value x(0) is contained in register 102. In box K7 the value of the amplitude x(4) is tested against a level value NIVX. It should be observed that the samples x(0), x(1), x(2), x(3) are not affected by the rest of the process. These four samples correspond to the delays with which the echo appears. The process thus commences with an examination of the level of the signal x(4). There is examined whether the amplitude of this signal x(4) in an absolute value exceeds the level NIVX by a certain factor FAC0. There is also examined whether this level NIVX exceeds −42 dBm0. These two conditions are shown in box K7. If these conditions are not satisfied, the value 0 is assigned to a variable $x_c(0)$, if these conditions are satisfied, branch Y is taken, which is a test of box K7, and the value x(4) is examined in box K10. If the value x(4) exceeds 0, branch Y is taken and the value +1 is assigned to the value $x_c(0)$. If this value is negative, the value −1 is assigned to the variable $x_c(0)$ in box K11. Thus, the evaluation of the sign function has already been commenced. From boxes K8, K11 and K12 one proceeds to box K15 where the synthesized echo r'(i) is evaluated in accordance with formula (1). Box K17 indicates the reading of a variable RIN, this variable being contained in the register 101, so that it is possible in box K20 to evaluate a quantity ROUT which represents the signal whose echo has been suppressed. The formula indicated in box K20 is to be compared with formula (3). Then, the value ROUT calculated in this manner is loaded into the register 103. This is indicated in box K22. Afterwards, in box K24, various variables relating to the signal levels defined by the contents of the registers 101, 102 and 103, NIX, NIRI, NIRD are updated. Box K26, which follows is the examination of various conditions: there is examined whether the flag GCOP is equal to 0, whether the absolute value of the signal ROUT is higher than −60 dBm0, whether this value is higher than NIVX-42 dB and whether "m" has either value SLOW or FAST. If these conditions are not fulfilled, box K30 of FIG. 5 is proceeded to.

This box K30 indicates a test of the value m. If value m has two functions: a first function is to contain the value of a convergence parameter SLOW or FAST, and the second function (m adopts the value −1) is to indicate a divergence of the algorithm. If this value is equal to −1, there is thus divergence, box K32 is proceeded to, where the values $c_k$ are set to 0. Then, in box K34, the value "m" adopts the value FAST, so that the convergence of the formula (2) is faster. If the conditions shown in box K26 are fulfilled, box K40 of FIG. 5 is proceeded to. Box K40 indicates a test of the value ROUT. If this value is positive, branch Y is taken to go to box K42. There, the value of the factors $c_k$ is modified by a sign value "+", that is $+2^{-m} \cdot x_c(k)$. If this value is negative, box K44 is proceeded to, where the value $c_k$ is corrected to a negative value $-2^{-m} \cdot x_c(k)$. There should be observed that a low value equal to the least significant bit (LSB) has systematically been added; this to ensure the coefficient development. Once the operations indicated in one of the boxes K34, K42 and K44 have been carried out, box K50 is proceeded to. Box K50 indicates the shift operation of the various samples x(k), where k varies from 0 to N+4 and the shift of the associated signs $x_c(k)$, where k varies from 0 to N. Then box K52 is proceeded to, where the number of interruptions are counted. If this figure is not equal to 32, branch N is taken and box K55 is proceeded to, which indicates the end of the interrupt program. If this value is indeed equal to 32, branch Y is taken and box K60 is proceeded to. Worded differently, the operations which follow are carried out once per 32 initiated interruptions. This box K60 resumes counting interruptions when "cpint" equals zero. The rest of the process is shown in FIG. 6.

Figure 6:
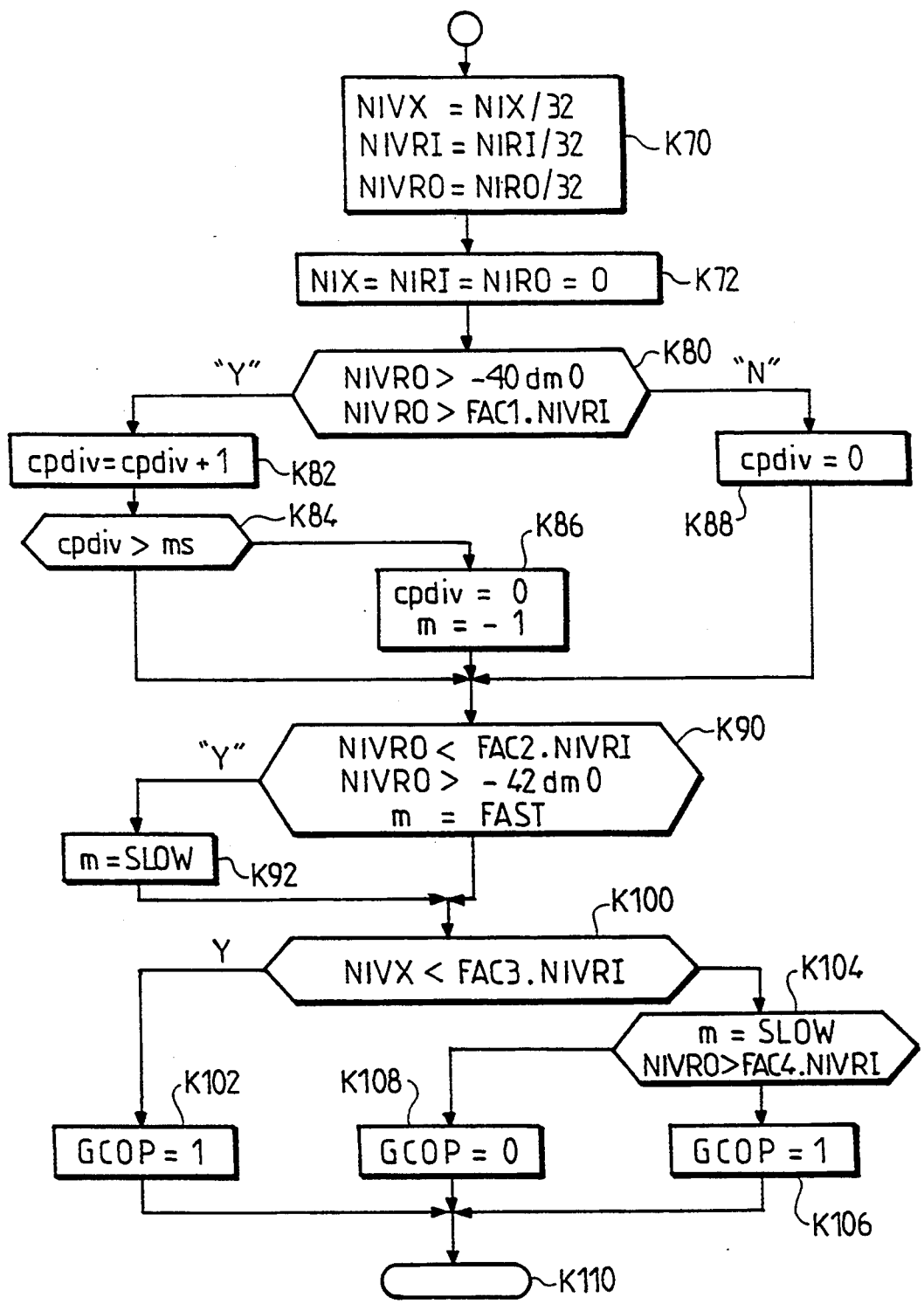

Box K70 of FIG. 6 shows an updating of the various levels NIVX, NIVRI, NIVRO. Box K72 reinitializes various values NIX, NIRI and NIRO used for updating previous levels. Finally, one proceeds to box KS0. This box KS0 indicates tests which show the eventuality of a divergence of the algorithm. First NIVRO is tested against a level of −40 dBmO, this level is also tested to find whether it is higher than a factor FAC1 for the level NIVRI. If these conditions are fulfilled, there is thus a tendency towards divergence. Branch Y is taken and box K82 is proceeded to. Here a divergence counter "cpdiv" is incremented by unity. In box K84 the contents of this counter are compared with a certain value "ms" which corresponds to a time period of various milliseconds. If these contents exceed the value "ms", there is thus divergence. The divergence counter is set to 0 and "m" is set to −1 to indicate that there is divergence, and this value will be used at the next interrupt call. If the conditions indicated in box KS0 are not fulfilled, branch N is taken and box K88 is proceeded to, where the divergence counter "cpdiv" is set to 0. The tests of box K90 relate to the detection of the beginning of the convergence of the algorithm. This is represented in box K90 where the case is examined where NIVRO is higher than a factor FAC2 for the level NIVRI. There is examined whether this level NIVRO is higher than −42 dBm0 and there is also examined whether the factor "m" is equal to FAST. If the conditions of box K90 are fulfilled, then "m" adopts the value SLOW in box K92. If these conditions of box K90 are not fulfilled, box K100 is proceeded to. Box K100 is also proceeded to once the assignment shown in box K92 has been made. If the subscriber speaks in the receiver 32 (this the case of doubletalk), it goes without saying that the echo canceller can be rendered defective by the signals brought about by this subscriber. This condition is thus to be detected (see box K100). If the test of box K100 gives a satisfactory result, box K102 is proceeded to where the flag GCOP is set to the value 1. If this test does not produce a satisfactory result, box K104 is proceeded to, where two conditions are verified; the first: does m have the value SLOW, the second: does NIVRO exceed the value NIVRI by a factor FAC4. If so, the flag GCOP adopts the value 1 in box K106. If not, the flag GCOP adopts the value 0 in box K108. Thus the program is terminated at box K110.

The factors FAC0, FAC1, FAC2, FAC3 and FAC4 are selected in such a way that they correspond to the values below:

FAC0: 0 dB
FAC1: ±1 dB
FAC2: −12 dB
FAC3: +6 dB
FAC4: −9 dB

I claim:

1. A transmit/receive station for use in a data communication system comprising a plurality of transmit/receive stations and wherein a data signal transmitted by a first station to another station results in an echo of the transmitted data signal accompanying a data signal received by said first-named station from said other station; said first-named station including an echo canceller circuit which comprises an adaptive filter for deriving a synthesized echo signal which approximates an echo signal which will be produced by a data signal transmitted by said first-named station, said echo canceller circuit further comprising a subtractor circuit for deriving an echo-corrected data signal by subtracting said synthesized echo signal from the transmitted data signal prior to transmission thereof; characterized in that said adaptive filter comprises:

delay means for successively delaying a data signal to be transmitted by a series of intervals (T) each corresponding to a data symbol period of said data signal, and producing respective samples of said data signal at the respective delay intervals;

means for multiplying the respective samples of said data signal by respective weighting factors and deriving a summation of the multiplied samples, said summation constituting said synthesized error signal; and calculating means coupled to said subtractor circuit for receiving said echo-corrected data signal and deriving said weighting factors based thereon; a weighting factor for a succeeding signal sample being derived by adding to the weighting factor for the preceding signal sample a correction term given by the product of the latter weighting factor by a constant (d), said constant (d) having a value less than one and an arithmetic sign determined by the difference between the preceding signal sample and the synthesized error signal relating to said preceding signal sample.

2. A transmit/receive station as claimed in claim 1, wherein said constant (d) is equal to $2^{-m}$, where (m) is an integer.

3. A transmit/receive station as claimed in claim 1, wherein said calculating means is a signal processor having a plurality of access ports and a plurality of registers connected thereto, and having an input for receiving an interrupt signal linked with an interrupt clock signal for triggering calculation of said weighting factors.

4. A transmit/receive station as claimed in claim 2, wherein said integer (m) has a value which may be either of a start value and an operation value, and said calculating means comprises means for analyzing whether there is convergence in the derivation of said weighting factors and giving said integer (m) said operation value when convergence is detected and said start value when divergence is detected.

5. A transmit/receive station as claimed in claim 3, wherein said calculating means analyzes the level of signals at said access ports and modifies calculation of said weighting factors based on said analysis.

6. A transmit/receive station as claimed in claim 5, wherein said analysis detects doubletalk disturbance levels, and said calculating means interrupts calculation of said weighting factors when the signals at said access ports have doubletalk disturbance levels.

7. A transmit/receiver station as claimed in claim 5, wherein said calculating means performs said analysis in response to certain of said interrupt signals.

* * * * *